(12) United States Patent
Nathan et al.

(10) Patent No.: US 8,292,712 B2
(45) Date of Patent: *Oct. 23, 2012

(54) JUKEBOX ENTERTAINMENT SYSTEM HAVING MULTIPLE CHOICE GAMES RELATING TO MUSIC

(75) Inventors: Guy Nathan, Nun's Island (CA); Tony Mastronardi, Pierrefonds (CA)

(73) Assignee: TouchTunes Music Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/238,224

(22) Filed: Sep. 21, 2011

(65) Prior Publication Data

US 2012/0009985 A1    Jan. 12, 2012

Related U.S. Application Data

(63) Continuation of application No. 12/923,426, filed on Sep. 21, 2010, now Pat. No. 8,052,512, which is a continuation of application No. 12/453,467, filed on May 12, 2009, now Pat. No. 7,819,734, which is a continuation of application No. 09/688,698, filed on Oct. 17, 2000, now Pat. No. 7,549,919.

(30) Foreign Application Priority Data

Sep. 15, 2000  (FR) ..................................... 00 11977

(51) Int. Cl.
  *A63F 9/24*  (2006.01)
  *A63F 13/00*  (2006.01)
(52) U.S. Cl. ...................... 463/9; 463/1; 463/40; 463/42
(58) Field of Classification Search .................. 463/1, 9, 463/25, 40–43; 273/236–237, 301, 429–430, 273/459–461; 434/322, 332, 335–336, 350–352; 705/1, 10, 14; 700/74; 345/716, 727
See application file for complete search history.

(56) References Cited

U.S. PATENT DOCUMENTS

| 3,982,620 A | 9/1976 | Kortenhaus |
| 4,186,438 A | 1/1980 | Benson |
| 4,232,295 A | 11/1980 | McConnell |

(Continued)

FOREIGN PATENT DOCUMENTS

AU  199954012  4/2000

(Continued)

OTHER PUBLICATIONS

"Darts Revolution Again", *Replay Magazine*, Mar. 1991, pp. 146-148.

(Continued)

*Primary Examiner* — Milap Shah
(74) *Attorney, Agent, or Firm* — Nixon & Vanderhye PC

(57) ABSTRACT

Entertainment system based on multiple choice competition games, characterized in that it comprises at least one terminal including connection means to a dedicated remote server (1), the system also comprising means of playing an extract of a recording with a configurable duration on at least one terminal (2, 3) comprising means of reproducing the recording, means of interaction with a user and means (21, 31) of connection with a dedicated remote server (1), means of asking a terminal user a question and suggesting multiple choice answers, the question being related to information characteristic of the extract of the recording, and the recording being selected by means independent of the terminal user.

17 Claims, 1 Drawing Sheet

U.S. PATENT DOCUMENTS

| | | |
|---|---|---|
| 4,335,809 A | 6/1982 | Wain |
| 4,335,908 A | 6/1982 | Burge |
| 4,412,292 A | 10/1983 | Sedam |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,582,324 A | 4/1986 | Koza |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,811,325 A | 3/1989 | Sharples |
| 4,825,054 A | 4/1989 | Rust |
| 4,829,570 A | 5/1989 | Schotz |
| 4,868,832 A | 9/1989 | Marrington |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,956,768 A | 9/1990 | Sidi |
| 4,958,835 A | 9/1990 | Tashiro |
| 4,999,806 A | 3/1991 | Chernow |
| 5,012,121 A | 4/1991 | Hammond |
| 5,041,921 A | 8/1991 | Scheffler |
| 5,058,089 A | 10/1991 | Yoshimara |
| 5,106,097 A | 4/1992 | Levine |
| 5,138,712 A | 8/1992 | Corbin |
| 5,155,847 A | 10/1992 | Kirouac |
| 5,163,131 A | 11/1992 | Row |
| 5,166,886 A | 11/1992 | Molnar |
| 5,180,309 A | 1/1993 | Egnor |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,262,875 A | 11/1993 | Mincer et al. |
| 5,276,866 A | 1/1994 | Paolini |
| 5,315,161 A | 5/1994 | Robinson |
| 5,339,413 A | 8/1994 | Koval |
| 5,341,350 A | 8/1994 | Frank |
| 5,355,302 A | 10/1994 | Martin |
| 5,357,276 A | 10/1994 | Banker |
| 5,369,778 A | 11/1994 | SanSoucie |
| 5,375,206 A | 12/1994 | Hunter |
| 5,418,713 A | 5/1995 | Allen |
| 5,420,923 A | 5/1995 | Beyers |
| 5,428,252 A | 6/1995 | Walker |
| 5,431,492 A | 7/1995 | Rothschild |
| 5,445,295 A | 8/1995 | Brown |
| 5,455,926 A | 10/1995 | Keele |
| 5,457,305 A | 10/1995 | Akel |
| 5,465,213 A | 11/1995 | Ross |
| 5,475,835 A | 12/1995 | Hickey |
| 5,481,509 A | 1/1996 | Knowles |
| 5,495,610 A | 2/1996 | Shing |
| 5,496,178 A | 3/1996 | Back |
| 5,499,921 A | 3/1996 | Sone |
| 5,511,000 A | 4/1996 | Kaloi et al. |
| 5,513,117 A | 4/1996 | Small |
| 5,548,729 A | 8/1996 | Akiyoshi |
| 5,550,577 A | 8/1996 | Verbiest |
| 5,555,244 A | 9/1996 | Gupta |
| 5,557,541 A | 9/1996 | Schulhof |
| 5,559,505 A | 9/1996 | McNair |
| 5,559,549 A | 9/1996 | Hendricks |
| 5,561,709 A | 10/1996 | Remillard |
| 5,566,237 A | 10/1996 | Dobbs |
| 5,570,363 A | 10/1996 | Holm |
| 5,583,994 A | 12/1996 | Rangan |
| 5,592,551 A | 1/1997 | Lett |
| 5,594,509 A | 1/1997 | Florin |
| 5,612,581 A | 3/1997 | Kageyama |
| 5,613,909 A | 3/1997 | Stelovsky |
| 5,619,247 A | 4/1997 | Russo |
| 5,619,698 A | 4/1997 | Lillich |
| 5,623,666 A | 4/1997 | Pike et al. |
| 5,642,337 A | 6/1997 | Oskay |
| 5,644,714 A | 7/1997 | Kikinis |
| 5,644,766 A | 7/1997 | Coy |
| 5,668,592 A | 9/1997 | Spaulding |
| 5,668,788 A | 9/1997 | Allison |
| 5,684,716 A | 11/1997 | Freeman |
| 5,691,778 A | 11/1997 | Song |
| 5,697,844 A | 12/1997 | Von Kohorn |
| 5,703,795 A | 12/1997 | Mankovitz |
| 5,708,811 A | 1/1998 | Arendt |
| 5,712,976 A | 1/1998 | Falcon |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,761,655 A | 6/1998 | Hoffman |
| 5,762,552 A | 6/1998 | Vuong |
| 5,774,668 A | 6/1998 | Choquier |
| 5,774,672 A | 6/1998 | Funahashi |
| 5,781,889 A | 7/1998 | Martin |
| 5,790,172 A | 8/1998 | Imanaka |
| 5,790,671 A | 8/1998 | Cooper |
| 5,790,856 A | 8/1998 | Lillich |
| 5,793,980 A | 8/1998 | Glaser |
| 5,798,785 A | 8/1998 | Hendricks |
| 5,802,599 A | 9/1998 | Cabrera |
| 5,808,224 A | 9/1998 | Kato |
| 5,809,246 A | 9/1998 | Goldman |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,848,398 A | 12/1998 | Martin |
| 5,854,887 A | 12/1998 | Kindell |
| 5,862,324 A | 1/1999 | Collins |
| 5,864,870 A | 1/1999 | Guck |
| 5,867,714 A | 2/1999 | Todd |
| 5,884,028 A | 3/1999 | Kindell |
| 5,884,298 A | 3/1999 | Smith |
| 5,887,193 A | 3/1999 | Takahashi |
| 5,913,040 A | 6/1999 | Rakavy |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,923,885 A | 7/1999 | Johnson |
| 5,930,765 A | 7/1999 | Martin |
| 5,931,908 A | 8/1999 | Gerba |
| 5,949,688 A | 9/1999 | Montoya |
| 5,959,869 A | 9/1999 | Miller |
| 5,959,945 A | 9/1999 | Kleiman |
| 5,966,495 A | 10/1999 | Takahashi |
| 5,978,855 A | 11/1999 | Metz |
| 6,002,720 A | 12/1999 | Yurt |
| 6,009,274 A | 12/1999 | Fletcher |
| 6,018,337 A | 1/2000 | Peters |
| 6,018,726 A | 1/2000 | Tsumura |
| 6,072,982 A | 6/2000 | Haddad |

| | | | |
|---|---|---|---|
| 6,151,634 A | 11/2000 | Glaser | |
| 6,308,204 B1 | 10/2001 | Nathan et al. | |
| 6,315,572 B1 | 11/2001 | Owens et al. | |
| 6,346,951 B1 | 2/2002 | Mastronardi | |
| 7,549,919 B1 * | 6/2009 | Nathan et al. | 463/9 |
| 7,819,734 B2 * | 10/2010 | Nathan et al. | 463/9 |
| 8,052,512 B2 * | 11/2011 | Nathan et al. | 463/9 |

FOREIGN PATENT DOCUMENTS

| | | |
|---|---|---|
| DE | 3723737 A1 | 1/1988 |
| DE | 3820835 A1 | 1/1989 |
| DE | A 3820835 | 1/1989 |
| DE | 4244198 | 6/1994 |
| DE | 19610739 | 9/1997 |
| EP | A 0082077 | 6/1983 |
| EP | 0140593 A2 | 5/1985 |
| EP | 0256921 | 2/1988 |
| EP | 0283304 | 9/1988 |
| EP | A 0283350 | 9/1988 |
| EP | 0309298 | 3/1989 |
| EP | A 0313359 | 4/1989 |
| EP | 0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0538319 B1 | 4/1993 |
| EP | A 0631283 | 12/1994 |
| EP | 0632371 | 1/1995 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974 896 A1 | 1/2000 |
| EP | 0982695 | 3/2000 |
| FR | A 2602352 | 2/1988 |
| GB | A 2122799 | 1/1984 |
| GB | 2166328 A | 4/1986 |
| GB | 2170943 | 8/1986 |
| GB | 2193420 | 2/1988 |
| GB | 2 238 680 A | 6/1991 |
| GB | 2259398 | 3/1993 |
| GB | 2262170 A | 6/1993 |
| JP | 57-173207 | 10/1982 |
| JP | 58-179892 | 10/1983 |
| JP | 60-253082 | 12/1985 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 07281682 | 10/1995 |
| JP | 08-279235 | 10/1996 |
| JP | 10-098344 | 4/1998 |
| WO | WO 86 01326 A | 2/1986 |
| WO | WO A 90 07843 | 7/1990 |
| WO | WO 91/08542 | 6/1991 |
| WO | WO A 91 20082 | 12/1991 |
| WO | WO 93/16557 | 8/1993 |
| WO | WO A 93 18465 | 9/1993 |
| WO | WO A 94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/45835 | 10/1998 |
| WO | WO 01/00290 | 1/2001 |

OTHER PUBLICATIONS

Bonczck, Robert H. et al, "The DSS Development System", 1983 National Computer Conference, Anaheim, California, May 16-19, 1983, pp. 441-455.

IBM Technical Disclosure Bulletin, vol. 30, No. 5, Oct. 1987, "Method for Automated Assembly of Software Versions", pp. 353-355.

"Robotic Wafer Handling System for Class 10 Environments" IBM Technical Disclosure Bulletin, vol. 32, No. 9A, Feb. 1990, pp. 141-143.

"High-speed Opens and Shorts Substrate Tester", IBM Technical Disclosure Bulletin, vol. 33, No. 12, May 1991, pp. 251-259.

Galen A. Grimes, "Chapter 18, Taking Advantage or Web-based Audio.", [accessed Mar. 24, 2000].

Petri Koskelainem "Report on Streamworks™", [accessed Mar. 24, 2000].

W. Richard Stevens, "TCP/IP Illustrated: vol. 1, the Protocols", Copyright 1994 . Feb. 27, 2012.

Nowell Outlaw "Virtual Servers Offer Performance benefits for Networks Imaging", Copyright 1993.

Back to the Tunes [online], [retrieved Jul. 23, 2001]. Retrieved from the Internet: <http://citc5.hispeed.com/rules.html>.

Johnny Rockets Name That Tune [online], [retrieved Mar. 7, 2002]. Retrieved from the Internet: <http://www.johnnyrockets.com/docs/funstuff.html.>.

Tom & Liz's Name That Tune [online], [retrieved Jul. 23, 2001]. Retrieved from the Internet: <http://home.att.net/~tomnliz/Music.html>.

Austin Cyber Limits: Name That Tune [online], [retrieved Jul. 23, 2001]. Retrieved from the Internet: <http://www.pbs.ork/klru/austin/games/namethattune.html>.

Mirriam Webster's Collegiate Dictionary, Tenth Edition, Merriam-Webster, Inc., p. 361, Copyright 1996.

Mickey B's Jukebox Revue—Name That Tune! [online], [retrieved Jul. 23, 2001]. Retrieved from the Internet: <http://mickeyb.com/tune/.>, Jun. 13, 2012.

* cited by examiner

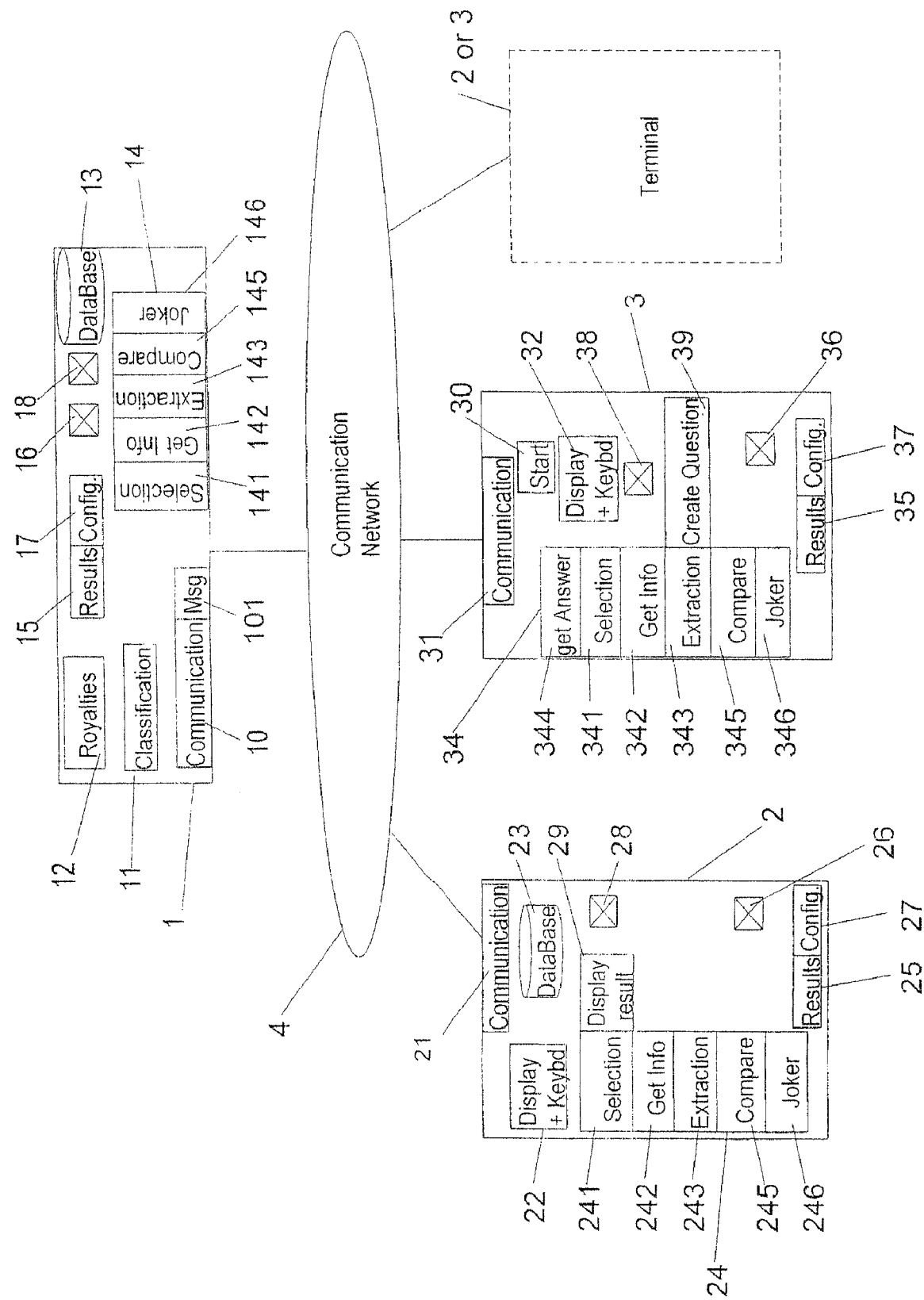

JUKEBOX ENTERTAINMENT SYSTEM HAVING MULTIPLE CHOICE GAMES RELATING TO MUSIC

CROSS-REFERENCE TO RELATED APPLICATION

This application is a continuation of application Ser. No. 12/923,426, filed Sep. 21, 2010 now U.S. Pat. No. 8,052,512, which is a continuation of application Ser. No. 12/453,467, filed May 12, 2009 now U.S. Pat. No. 7,819,734, which is a continuation of application Ser. No. 09/688,698, filed Oct. 17, 2000 now U.S. Pat. No. 7,549,919, which claims priority to French Application No. 96 11977, filed Sep. 15, 2000, the entire contents of each of which is incorporated herein in its entirety by reference.

FIELD OF THE INVENTION

This invention relates to an entertainment process based on competition games with questions with multiple choice answers related to audio or visual recordings (film, video clip, plays, etc.)

BACKGROUND OF THE INVENTION

Games based on the musical knowledge of players are known in prior art, and particularly radio or television games. For example, the game is of the questions/answers type during which a player must for example give the name of an artist, the title or the next word of a song from which a short extract is played. In this type of game, questionnaires are prepared before the game and the game takes place either with a single player, or in the case of a television game with several competitors in the same place and competing on the same question.

OBJECTS AND SUMMARY OF THE INVENTION

Therefore, the purpose of this invention is to overcome the disadvantages of prior art by proposing an entertainment process based on the music theme by which players in places remote from each other can participate in contest games based on the music theme.

This purpose is achieved using an entertainment system based on multiple choice competition games, characterized in that it comprises at least one terminal including connection means to a dedicated remote server, the system also comprising means of playing an extract of a recording with a configurable duration on at least one terminal comprising means of reproducing the recording, means of interaction with a user and means of connection with a dedicated remote server, means of asking a terminal user a question and suggesting multiple choice answers, the question being related to information characteristic of the extract of the recording, and the recording being selected by means independent of the terminal user.

Another objective is to be able to assign prizes as a function of the classification of participants (prize=free songs, free drink, free participation in the next competition).

This purpose is achieved using an entertainment system like that defined above and characterized in that each terminal comprises means of selecting and validating the terminal user's answer, validation means that update a results file containing information representative of the answer chosen by the user, this file being transmitted to the server by each terminal, to count the score achieved by each user and to classify users.

Another objective of the invention is to propose an entertainment process based on the music theme, in which players located in places remote from each other can participate in games tournaments on the music theme.

This purpose is achieved by an entertainment process based on multiple choice competitive games characterized in that it comprises:
  a step in which an extract of a recording with a variable duration is played on a terminal equipped with reproduction means,
  a step in which a question related to the extract is created using the terminal interaction means including proposed multiple choice answers, the recording being selected independently of the terminal user.

Another purpose of the invention is to take account of author copyrights when the games include sound or visual reproductions of all or some musical or visual recordings.

This purpose is achieved by an entertainment process as defined above and characterized in that a log file is updated every time that an extract of a recording is reproduced in a questionnaire screen, the log file contains the identification of the recording and the number of times that the recording has been played, and the log file is periodically transmitted to the server which calculates author's royalties to be paid to the various persons entitled to them.

BRIEF DESCRIPTION OF DRAWING

The invention and its characteristics and advantages will become clearer after reading the description with reference to the single attached drawing that represents a simplified diagram of a network comprising a server and several terminals to implement the process according to the invention.

DESCRIPTION OF THE PREFERRED EMBODIMENT

The invention will now be described with reference to FIG. 1. The entertainment process according to the invention is particularly applicable to a computer network comprising a server 1 dedicated to the distribution of audiovisual information, for example such as songs, musical works, films, television programs, etc. This server 1 is connected through a communication means 10 to several terminals 2, 3 through a communication network 4 and communication means 21, 31 installed in each terminal 2,3. The communication network 4 may be of any known type. In particular, the communication network 4 may be a wire or cellular telephone network, or a radio network, a cable network, or optical or satellite network, or any combination of these networks. Similarly, the communication network 4 can introduce intermediate multiservice servers (not shown) that are then connected between the dedicated server 1 and a group 2, 3 of terminals connected to the multiservice server. For example, a multiservice server may be a cellular telephony operator, an Internet access supplier, an access supplier to a cable television network or a satellite network. In this case, the terminal 3 may be a cellular telephone, or a decoder connected to a television or a personal computer. Similarly, a terminal (2) may be an audiovisual reproduction system as described in patent applications EP786121 and EP974896.

Each terminal 2, 3 comprises at least storage means associated with stored information processing means, for example in the form of compressed and encrypted recordings of programs or program and message modules and means 22, 32 of interaction with the user. The interaction means 22, 32 include a display means such as a screen, and at least one selection means, for example chosen from a touch screen, a pointer such as a mouse, browser key in a menu, or a voice control system.

The principle of the entertainment process according to the invention is to run a game program starting by a button triggered by or on interactive means and based on a multichoice questionnaire on a theme, for example music. The specific feature of this questionnaire is that is it based on the collection of information in a database 13, 23 stored on the dedicated server 1 and possibly on a specific terminal 2. In this case, the specific terminal 2 is an audiovisual reproduction system like that defined in patent application EP786121 and EP974896. The database 13, 23 comprises at least information relative to music extracts. In particular, the database comprises at least one table including titles of recordings, artists, the author(s), disk or recording publishers, the year of issue and any other information characterizing the visual or musical recording. Furthermore, the database 13, 23 includes all or some of the data necessary for audio reproduction of musical extracts. According to the invention, each question includes the audio and/or video reproduction of all or some of the recording.

Questionnaires are usually generated in two ways.

In a first variant, the questionnaires are made automatically by a game module 14, 24, 34 memorized on each terminal 2, 3 or on the dedicated server 1. The game module 14, 24, 34 can also be stored on a multiservice server. The main functions of the game module 14, 24, 34 is firstly to trigger playing at least one extract of a recording using decompression and possibly decryption means, and secondly to generate a display screen comprising at least one question about the extract from the recording in the database 13, 23 played on the terminal and a choice among at least two possible answers displayed and that can be selected by one of the interaction means 22, 32.

In another example, the question consists of recognizing the song from an audio extract of it.

Each screen corresponding to each question is generated as follows. Firstly, the game module 14, 24, 34 comprises selection means 141, 241, 341 for example comprising a program module or sub-module to select a recording, for example a musical recording, at random from the recordings in the database 13, 23. For example, this random selection can be made using a unique identification number assigned to each recording. The chosen identification number must be the number of a recording for which the party entitled to royalties has given its agreement for the recording to be used in a game. In order to do this, a flag is defined for each recording in the database 13, 23 indicating that the recording cannot be used for a game. Thus, after selecting a recording identification number at random, the selection means 141, 241, 341 verify that a flag is present. If the flag is not present, the selection means validate the selection of the recording. If the flag is detected, the selected recording is ignored and another recording is chosen instead. The other recording can be chosen either using another random selection operation, or by choosing the next identification number in the database. The selection means will check again to see if a flag is present. The selection operation is repeated until a recording is selected that can be used for a game.

The game module 14, 24, 34 comprises a sub-module 143, 243 for the extraction of data necessary for an audio reproduction of an extract from the selected recording. The quantity of extracted data corresponds to an extract with a given duration. This given duration is of the order of a few seconds and may be modified by configuration or automatically as a function of a results evaluation program 16, 26, 36 to make the answer or the choice of answer to the question easier or more difficult. For example, selection parameters for the extract (for example audio or video) may be stored in a configuration file 17, 27, 37 read by the extraction sub-module 143, 243 for each generation of a question with an audio or visual reproduction of a recording. Similarly, the configuration file 17, 27, 37 for the extraction sub-module 143, 243 is configured such that the moment in the recording at which the extract begins can be chosen, for example at random. The instant at which the extract starts can also be configured in the configuration file 17, 27, 37 for the extraction sub-module 143, 243. Thus, for this type of question based on the audio reproduction of an extract from a recording, the graphic sub-module generates a display screen for which the question includes the text of the question concerning the recording and at the same time the game module 14, 24, 34 triggers a command to reproduce the extract from the recording collected by the extraction module, on the audio reproduction means on the terminal.

In a first variant, the question could simply consist of a predetermined text such as the following:

"What is the title of this recording?" or "Who is singing this song?" or "When was this film released?".

In a second variant, the question may also comprise information about the reproduced recording, for example to build up a clue to the right answer.

In this case, the game module 14, 24, 34 comprises means 142, 242, 342, for example a program module in the database 13, for the collection of at least two determined items of information (INF 1, INF 2) about the recording selected at random. These two determined items of information may either be of the same type for the entire questionnaire, or they may vary at random from one question to the other depending on the type of game module 14, 24, 34. A first information (INF 1) collected is then used by a graphic sub-module of the game module to enter the question in the generated screen. The question includes an invariable text and a part corresponding to the first collected information (INF 1). For example, one question type is as follows:

"In what year did "INF 1" sing this song?".

In this example, ENF 1 is the name of the artist who sang the replayed song.

"Who produced this film in "INF 1"?".

In the second example, INF 1 is the year in which the extract from the film from which the extract was taken.

In both of the variants described above, the screen generated by the graphic sub-module of the game module 14, 24, 34 also comprises at least two selection areas showing the possible choices of an answer to the question asked, for example in the form of the multiple choice answer. Among these selection areas, a first area comprises the second information (INF 2) (title, author, singer, composer, producer, actor, publisher, year of release) about the extract from the selected recording and forming the right answer. The other selection areas contain information selected at random in the database by the selection sub-module 141, 241, 341 and containing the wrong answers. This information selected at random is all of the same type (chosen among types such as title, author, singer, composer, producer, actor, publisher, year of release) as the second determined information (INF 2) displayed in the first selection area. In other words, the information displayed in the other selection areas relates to recordings different from the those previously selected but has the same attribute in the database as the attribute of the second determined information (INF 2) displayed in the first selection area. Thus, for example if the determined information displayed in the first selection area is related to the song title, then the selection sub-module will select at least another song title at random in the database for the other information displayed in the remaining selection areas.

In order to generate questionnaires with different degrees of difficulty, the game module 14, 24, 34 reads a parameter file, for example to increase the number of possible answers. The parameter file for the game module 14, 24, 34 can also be configured to select "wrong answers" not in the set of musical or audiovisual recordings in the database, but in only part of this database 13, 23 with points in common with the recording selected at random such that the incorrect answers could be plausible considering the question asked. Thus, if the recording selected at random to create the question is country style music, then the wrong answers will be selected among country music style recordings.

Similarly, the recording chosen at random to create the question can be chosen among one type of recording instead of among all recordings in the database, for example all questions may relate to the same style, the same author or the same artist.

The advantage of the game module according to the first variant is that each questionnaire is different for each game and that each questionnaire is made automatically and unpredictably. Therefore, it is impossible to know what questions will be asked in advance.

When the database 13 is not stored on the terminal 3, the game module 34 includes a communication sub-module 344 that builds up messages to interrogate the database 13 on the dedicated server 1 in order to receive information necessary for generation of the question screen, namely determined information about an extract of a recording selected at random to build the question and the corresponding answer and the information selected at random, for example in the same type of recording or in recordings made at the same period, to form the wrong answers. Thus, messages sent by terminals include selection commands to be used by a module for management of the database 13 on the server 1. The messages also comprise the address of the sending terminal. The server 1 also includes a sub-module 101 for creating and transmitting messages to transmit the result of the collection made by the database manager, to the sending terminal. When it receives the answer from the server, the communication sub-module 344 of the terminal 3 extracts the information collected in the database so that the terminal graphic module 39 can use it to generate the question screen.

Similarly, in another variant, the game module is 35 located on the dedicated server 1 and the questionnaire is started by a command sent by the terminal 2 to start the game module 14 that, in this case only, comprises a start module 30 to start the game with the server to activate a game start button controlled by interactive means. In this variant embodiment, the server 1 comprises a communication module that generates messages comprising information representative of the display corresponding to the question screen. A graphic module 39 of the terminal is designed to interpret messages sent by the server to create question screens as described above. When a question includes a sound or visual reproduction of an extract from a recording corresponding to the question, the server sends information representative of the audio or visual extract in the message, with a command to play this extract.

Information representing the audio extract is in compressed and coded form if the terminal is equipped with decompression and decoding means, or in plain text if the terminal is only capable of decompression.

When the graphic sub-module of the terminal displays the multiple choice answer screen, the user (in other words the player) is prompted to answer the question using interaction means by pointing to the answer of his choice. When the game module 14 is located on a dedicated server 1, selection or validation of a selection in a selection area will cause a message to be sent containing the identifier of the chosen answer and information to identify the terminal or the player and activating a comparison sub-module 145, 245 on the server 1. When the game module 24, 34 is stored on the terminal 2, 3, selecting or validating the selection of an area on the screen by interaction means will cause activation of a comparison module 145, 245 stored on the terminal 2, 3. In both cases, the comparison sub-module 145, 245 compares the position of the area selected by the player, and for example corresponding to the address of a stored response, with the right answer. This sub-module then updates a results file 15, 25, 35, using the game module 14, 24, 34. This results file contains firstly identification of the player and/or the associated terminal 2, 3, and secondly either the "true" Boolean value to show that the answer selected by the player is the right answer, or a "false" boolean value to indicate that the answer selected by the player is the wrong answer, for each question.

In another variant, the results file 15, 25, 35 10 comprises an identification of the player and/or the terminal 2, 3 and a counter incremented by a determined value every time that the answer selected by the player is the right answer and a second counter incremented every time that the answer selected by the player is a wrong answer (or the first counter decremented by a different value).

According to one variant embodiment, when the game module 24, 34 is stored on the terminal 2, 3, the terminal comparison sub-module 245 is connected to the graphic sub-module 29 to trigger the display of a screen informing the user either that his answer was right, or that he made a mistake and in this case to tell him the right answer. When the game module 14 is located on the server 1, the server contains means 101 of creating and transmitting messages to the terminal, these messages comprising information and associated commands causing the display of a screen informing the user either that he gave the right answer or that he made a mistake. The right answer can also be given if he made a mistake.

According to another variant embodiment, the comparison module comprises means of sending messages from the server to each of the terminals participating in the game by addressing each terminal to generate a screen on each terminal triggering the display of a table displaying the scores of the different players playing on each of the different terminals.

The results file 15, 25, 35 may also comprise information identifying the type and degree of difficulty of the questionnaire. The type of questionnaire depends on the style, for example the style of music (country, rock, rap) about which the questions are asked.

The results file 15, 25, 35 is stored either on the special terminal 2, 3 or on the dedicated server 1. If it is on the dedicated server, whenever the player selects an answer, a sub-module stored on terminal 2 generates a message containing information representative of the position of the selected area, this message is then sent to the dedicated server 1 by the terminal 2, 3 with the terminal identifier and the server uses the comparison module 145, 245 to determine if the answer is right.

After the results file 15, 25, 35 has been updated, or at the same time, the game module 14, 24, 34 generates a new screen containing a new question.

At the end of the questionnaire, in other words when a determined number of question screens has been displayed, the results file 25, 35 stored on the terminal 2, 3 is sent to the dedicated server 1 through the communication network 4.

The results files 15, 25, 35 transmitted by 25 terminals or stored by the dedicated server 1 are processed by a classification module 11 stored on the server 1, firstly to extract information representative of the results achieved by the user of each terminal, and secondly to update a classification of the different players as a function of the scores that they have achieved in answering the questionnaires. As already described, the results files 15, 25, 35 may comprise information representative of the type of music on which the questionnaire is based, and/or the degree of difficulty. Thus, the player classification may be determined as a function of the type of questionnaire, its difficulty and the category to which the player belongs (beginner for anyone who has never been registered on the server, advanced for a player who has obtained results above a certain level, expert for a player who has exceeded a second higher level). The dedicated server 1 comprises means 101 of creating a message and sends a message to each player, in other words to each terminal 2, 3, containing information representative of the player's classification. When this message is received, a graphic module on the terminal 2, 3 creates a screen showing the player's classification among the others.

The degree of difficulty of the questionnaire may be modified as a function of the classification of a player. For example, this modification may be made by downloading a new game module 24, 34 from the dedicated server 1 to replace the game module already installed on the terminal.

This new game module then comprises a new 20 configuration file 17, 27, 37 and a new parameter file containing new question creation parameters.

Similarly, depending on the classification made by the server 1, prizes may be assigned to the leading players in the classification. For example, when the terminal is a reproduction system, the prizes may include the possibility of selecting a song on the reproduction system free of charge, or a free drink at the bar in which the reproduction system is installed, or free participation in the next game when a charge is normally made to participate in the game.

In another variant embodiment, the module 24, 34 is updated by the dedicated server 1 sending an update file, comprising essentially commands to modify the parameters file for the game module 24, 34. Thus, as already explained, the number of possible choices for answering the question can be modified.

A second means of creating the questionnaire consists of creating each question screen in advance. Thus, all questions in each questionnaire are known in advance. However, each question is applicable to a recording for which characteristic information (title, artist, etc.) is stored in the database 13, 23. Consequently, for this questionnaire, each screen contains the text of the question and a command to collect at least one item of information about the recording referred to in the question and contained in the database 13, 23. In the same way as in the first variant, the question screen comprises a first selection area containing the text for the right answer and at least one second selection area containing the text for a wrong answer. The text in the selection areas corresponding to the wrong answers may be obtained either by means of a command to collect determined information from the database, or it may consist of a predetermined text, or may be obtained by means of a random selection command to select information in the database.

For example, one question could be based on the principle consisting of finding the missing word or information in a recording in which the player is asked to find the missing information. In order to do this, the game module 14, 24, 34 comprises a sub-module to process the extract and to mute or hide part of the image of a portion of the extract of the recording when it is reproduced by the game module, in addition to the module for extraction of information representative of the audio or video reproduction of the recording.

As already explained, the extraction module retrieves information representative of an extract from the recording with a given duration, starting from a given moment of the recording. The processing sub-module is configured to mute or hide the extract while it is being reproduced at a given instant of the extract and for a given time, for example corresponding to the information that the player is expected to find.

Thus, a question of this type comprises firstly a command sent to an extraction sub-module 143, 243 to retrieve information representing the extract from the chosen recording containing the information to be found, from the database. Secondly, the question includes a mute or hide command sent to the processing sub-module, for example to eliminate the sound volume of the determined portion of the extract being reproduced, or to hide a portion of the image. Thirdly, the question may include a command sent to the collection sub-module 142, 242, 342 to extract the name of the song and/or the artist and/or the publisher and/or any other information characterizing a recording in order to build up the question.

In one variant embodiment, muting generated by the processing module is replaced or complemented by mixing a sound or video signal masking the audio or video reproduction of the information to be found, at the given moment.

In another variant, for example in the case in which information representing the audio reproduction of the recording is not stored in the database, the questionnaire includes firstly data representing the extract from the recording also including mixing of the sound signal or a volume reduction corresponding to the missing words. Secondly, a command to play these data on the audio reproduction means of the terminal 2, 3.

Player responses are managed in the same way as before. Thus, for each answer, the results file is updated by a comparison module 145, 245 in the game module. Similarly, the dedicated server 1 classifies players in the same way and transmits the classification results to each player.

Unlike the first type of questionnaire, the second type of questionnaire is made in advance, and consequently each module corresponding to a questionnaire of the second type comprises a flag representative of how the questionnaire is used. As soon as the questionnaire has been used for a player or a group of players, the flag associated with this player or group of players is set in a table on the server such that the questionnaire cannot be reused by the same player or the same group. When the game module is activated by one or several players, in other words by one or several terminals, the game module 14, 24, 34 verifies if the flag is set in the corresponding table. If it is set, another questionnaire of the same type is sent to the terminals 2, 3.

The advantage of the second type of questionnaire is that several players can answer the same questionnaire at the same time. In the second case, the classification sub-module of the server 1 is configured to manage the results of several players, in other words terminals 2, 3 replying to the same questionnaire at the same time. In order to do this, the comparison module 145, 245 described above generates a message to the server after each answer by each player. This message includes an identification of the sender terminal 2, 3 and information representative of the player's answer to a question, for example identified by its number. Starting from these messages, the classification module 11 sorts the terminals as a function of the answers provided. The dedicated server 1 then transmits a message containing information representing the general classification of the game, and possibly presenting answers given by other players, to each terminal participating in the same questionnaire. The graphic sub-module of the terminal 2, 3 uses this message to generate a screen to display the classification and possibly the answers given by the other participants.

According to one variant embodiment, a payment procedure takes place before the game module 14, 24, 34 is started. This procedure may be in several forms. Thus, when the terminal 2 is a reproduction system comprising payment means, game mode is selected by action on control means in the audiovisual reproduction system, and the result is that a specific screen is displayed. This specific screen comprises a message inviting the user to pay an amount of money using payment means installed on the terminal, or to enter information necessary to subsequently debit the user's bank account to pay for his participation in the game. After making the payment or giving the information necessary to debit his account, the user is allowed to access the game module. The game module starts after the means of payment in the audiovisual reproduction system has detected the requested sum.

When the terminal 3 is not equipped with means of payment, the game module will not be activated until after a communication with the dedicated server 1. As explained above, information is collected from the database on the dedicated server 1 to generate the screens on the terminal. Access to the database is then preceded by a terminal authentication procedure. Thus, the terminal must be identified by the server before it can access the database. For example, this identification is assigned when a subscription procedure is performed before the first time that the terminal is connected to the server. This subscription procedure may include a payment step during each new connection, in which case the dedicated server 1 asks the terminal for its identification to authorize access to the database.

In one variant embodiment of the invention, the player has at least one joker to help him choose his answer. For example, a joker can be selected by using a virtual button represented on the question screen displayed on the display means of the terminal 2, 3 and pointed at by the user using interaction means. Selecting a joker starts a sub-module 146, 246, 346 that modifies at least one element of the question to make the player's answer easier.

For example, this joker sub-module 146, 246, 346 can cause reproduction of the extract of the recording with different parameters, for example by increasing the duration of the extract. In this case, and for this question only, the extraction module parameter file is modified so that the data extracted from the database result in a longer extract from the recording.

In another example, the joker sub-module 146, 246, 346 modifies the display screen, for example by hiding at least one selection area containing a wrong answer. In another example, the joker sub-module 146, 246, 346 gives the right answer and considers that the player has given the right answer.

This joker sub-module 146, 246, 346 also includes a file forming a joker counter and containing information representative of the number of jokers available. This file is updated at the beginning of the game, for example, with a predetermined number of jokers. Every time that the user selects the virtual button to validate a joker, the joker sub-module 146, 246, 346 checks if the available number of jokers is equal to zero, and if it is not the sub-module decrements the number of jokers by one. Otherwise, the joker sub-module 146, 246, 346 displays a message stating that the jokers credit is exhausted. In one variant embodiment, the jokers counter is initialized to zero at the beginning of the game. When the user selects the virtual button to select a joker for the first time, a jokers payment screen is displayed inviting the player to pay an amount of money to obtain at least one joker. The jokers counter is updated to include the new number of jokers, depending on the amount of money paid for by the player. If the jokers counter is reduced to zero during the game and the player selects the virtual button again to validate a joker, the jokers payment screen can be displayed again so that the player can rebuild his stock of jokers by making another payment.

The jokers payment rule can be defined such that the amount necessary to pay for a joker increases as the number of jokers requested by the player since the beginning of the game increases.

When the questionnaire includes at least one reproduction of at least one extract from a recording, the game module 14, 24, 34 includes a log file updated by a specific sub-module. This log file contains information representative of the number of times that a recording was played during the game, and possibly the duration of the reproduced extracts.

The log file is either stored on the terminal 2, 3 or on the dedicated server 1. When the log file is stored on the terminal 2, 3, the communication means periodically transmit information contained in the file to the server 1, and then the game module 24, 34 stored on the terminal 2, 3 reinitializes the log file.

The information contained in log files is processed by a royalties calculation module 12 that extracts information about the use of recordings to determine and calculate the royalties that are to be paid to the different parties entitled to them.

Thus, the entertainment system according to the invention is characterized in that it comprises at least one terminal comprising connection means to a remote dedicated server 1, the system also comprising means of playing an extract with a duration that can be varied, of a recording on at least one terminal 2, 3 comprising recording reproduction means, interaction means with a user and connection means 21, 31 with a remote dedicated server 1, means of asking a terminal user a question, suggesting multiple choice answers, the question being related to information characteristic of the extract from the recording, the recording being selected by selection means independent of the terminal user.

According to another feature, each terminal comprises means for the user of the terminal 2, 3 to select and validate his answer, the validation means updating a results file 15, 25, 35 containing information representative of the answer chosen by the user, this file being transmitted to the server 1 by each terminal 2, 3 to count the score made by each user to classify the users.

According to another feature, the played extract from the recording and the information necessary to create the question about information characteristic of the extract from the recording and the multiple choice answers are stored in a database stored on storage means on the server 1 or on storage means on the terminal 2.

Similarly, the entertainment process according to the invention is characterized in that it comprises:
  a step in which an extract of a recording is played, for a variable duration, on a terminal provided with reproduction means, a step in which a question related to the extract is created using the terminal interaction means 2, 3, suggesting multiple choice answers, the recording being selected independently of the terminal user.

According to another feature, the process also comprises:
a step in which a results file 15, 25, 35 is sent by each terminal to a dedicated server 1 containing information representative of the answer chosen by the user using interaction means, to count the score made by each user to classify users.

According to another feature, the step in which the question is created using interaction means is preceded by a payment step.

According to another feature, the recording on which determined information is collected is selected at random in a database stored either on the server or on the terminal.

According to another feature the choice of the recording from which the extract is taken is made from a determined type of recording contained in the database.

According to another feature, a log file is updated every time that an extract of a recording is reproduced in a screen of the questionnaire, the log file contains the identification of the recording and the number of times that the recording has been played, the log file is transmitted periodically to the server 1 that calculates royalties to be paid to the various authors.

According to another feature, the process comprises a step in which a joker is selected and validated, this step comprising a step in which the question and/or multiple choice answers are modified to make it easier for the user to find an answer.

According to another feature, the step in which a joker is selected and validated is preceded by a payment step in which the user is invited to pay an amount of money to obtain a determined number of jokers.

Persons experienced in the subject will realize that many other specific embodiments of this invention would be possible without going outside the scope of the invention as claimed. Consequently, the various embodiments must be considered as illustrations, but can be modified within the scope defined in the attached claims, and the invention cannot be limited to the details given above.

What is claimed is:

1. A jukebox terminal configured to provide a multiple choice competition game and to communicate with a server over a communications network, the jukebox terminal comprising:
   an audio system for playing, for the needs of a game, at least a portion of a musical recording;
   a display configured to display information in the form of a question and multiple choice answers to the question, wherein the question relates to the portion of musical recording that has been played;
   a user interface configured to enable a user to select an answer from the displayed multiple choice answers;
   a scoring module for recording the answer selected by the user and whether if the answer corresponds to a correct answer;
   a storage device that stores a library of musical recordings that are playable on the terminal for a fee, the library of musical recordings being updatable with additional musical recordings through communication with the server so as to define a customized library of musical recordings on the jukebox terminal;
   a game module being configured to automatically cause, for the needs of the game, an update to the customized library of musical recordings stored in the storage device of the terminal based on musical recordings stored on the server and/or on another jukebox terminal connected to the server, through communications of the another jukebox terminal with the server;
   wherein the terminal is configured to randomly select the musical recording to be used for the game from a subset of musical recordings in the customized library of musical recordings, each musical recording in the subset having information associated therewith indicating whether or not the musical recording can be used for the game, and
   wherein the terminal is further configured to randomly select and display the question about the selected musical recording, to determine and display the correct answer relating to the randomly selected question, and to randomly select and display a number of wrong answers relating to the randomly selected question.

2. The terminal of claim 1, wherein the terminal is configured to send information to the server regarding how the user performed during the game.

3. The terminal of claim 2, wherein the server is configured to receive game performance information for a plurality of different users and rank the users according to their performance.

4. The terminal of claim 3, wherein the server is configured to send user ranking information to the terminal, and the terminal is configured to display the ranking information.

5. The terminal of claim 4, wherein the terminal is configured to communicate with the server to receive, from the server, user ranking information sent to the server from a plurality of terminal devices.

6. The terminal of claim 1, wherein the terminal is further configured to randomly select the question about the selected recording from a list of predetermined questions.

7. The terminal of claim 1, wherein the terminal is further configured to randomly select a limited portion of the selected recording for playback to a user.

8. The terminal of claim 1, wherein the terminal is further configured to select a limited portion of the selected musical recording for playback to a user based on at least one predetermined criteria.

9. The terminal of claim 1, wherein the storage device is configured to store information relating to each musical recording and wherein a random question relates to at least one category of information, wherein the random wrong answers are selected from within the same category stored in reference to different songs.

10. The terminal of claim 1, wherein a log file is updated every time an extract of a recording is reproduced in a questionnaire screen.

11. The terminal of claim 10, wherein the log file includes an identification of the selected recording and a number of times that the selected recording has been played.

12. The terminal of claim 11, wherein the log file is transmitted to the server, the server being configured to calculate royalties in dependence on information stored in the log file.

13. The terminal of claim 1, wherein the terminal is configured to read a parameter file indicating a degree of difficulty of the question.

14. The terminal of claim 13, wherein questions of different degrees of difficulty are presented to different users based on classifications of said users.

15. The terminal of claim 14, wherein users of the terminal are classified as a function of scores that they have achieved.

16. The terminal of claim 15, wherein the function balances factors including question types, difficulty of questions answered, and/or current user classification.

17. The terminal of claim 1, wherein questions are asked to users based on degrees of difficulty associated with the questions and current classifications of the users, the classifications being based on scores previously earned by the users.

* * * * *